(12) United States Patent
Tanisue et al.

(10) Patent No.: US 12,366,657 B2
(45) Date of Patent: Jul. 22, 2025

(54) PHOTOELECTRIC SENSOR AND THRESHOLD SETTING METHOD

(71) Applicant: OMRON Corporation, Kyoto (JP)

(72) Inventors: Kohei Tanisue, Kyoto (JP); Yusuke Iida, Kyoto (JP); Norihiro Tomago, Kyoto (JP)

(73) Assignee: OMRON Corporation, Kyoto (JP)

( * ) Notice: Subject to any disclaimer, the term of this patent is extended or adjusted under 35 U.S.C. 154(b) by 500 days.

(21) Appl. No.: 17/800,217

(22) PCT Filed: Feb. 4, 2021

(86) PCT No.: PCT/JP2021/004024
§ 371 (c)(1),
(2) Date: Aug. 16, 2022

(87) PCT Pub. No.: WO2021/181959
PCT Pub. Date: Sep. 16, 2021

(65) Prior Publication Data
US 2023/0057540 A1    Feb. 23, 2023

(30) Foreign Application Priority Data
Mar. 12, 2020   (JP) ................................ 2020-042577

(51) Int. Cl.
*G01S 17/04*   (2020.01)
(52) U.S. Cl.
CPC .................... *G01S 17/04* (2020.01)
(58) Field of Classification Search
CPC .... G01S 17/04; G01J 1/42; G01J 1/44; H01H 35/00; H03K 17/78; G01V 8/12
See application file for complete search history.

(56) References Cited

FOREIGN PATENT DOCUMENTS

| JP | H07221623 | 8/1995 | |
|---|---|---|---|
| JP | H09238064 | 9/1997 | |
| JP | 09284116 A | * 10/1997 | ............. H03K 17/78 |
| JP | 109284117 | 10/1997 | |
| JP | H09284116 | 10/1997 | |
| JP | H11112319 | 4/1999 | |
| JP | 2004320372 | 11/2004 | |

(Continued)

OTHER PUBLICATIONS

"International Search Report (Form PCT/ISA/210) of PCT/JP2021/004024," mailed on Apr. 6, 2021, with English translation thereof, pp. 1-5.

(Continued)

*Primary Examiner* — Georgia Y Epps
*Assistant Examiner* — Don J Williams
(74) *Attorney, Agent, or Firm* — JCIPRNET

(57) ABSTRACT

Provided are a photoelectric sensor and a threshold setting method. The photoelectric sensor is a photoelectric sensor detecting an object and includes a light reception part, an object determination part, and a setting part. The light reception part receives light to obtain a light reception amount. The object determination part determines presence/absence of the object based on the light reception amount and a threshold. The setting part sets the threshold based on the light reception amount during a period in which it has been determined that the object is present and the light reception amount during a period in which it has been determined that the object is absent.

6 Claims, 10 Drawing Sheets

(56) References Cited

FOREIGN PATENT DOCUMENTS

| JP | 2005140596 | 6/2005 |
|---|---|---|
| JP | 2006019939 | 1/2006 |
| JP | 2007139494 | 6/2007 |
| JP | 2014096715 | 5/2014 |

OTHER PUBLICATIONS

"Written Opinion of the International Searching Authority (Form PCT/ISA/237) of PCT/JP2021/004024," mailed on Apr. 6, 2021, with English translation thereof, pp. 1-8.
"Office Action of Japan Counterpart Application", issued on Mar. 1, 2024, with English translation thereof, p. 1-p. 10.
"Office Action of Japan Counterpart Application", issued on Jul. 11, 2024, with English translation thereof, p. 1-p. 12.

* cited by examiner

PHOTOELECTRIC SENSOR AND THRESHOLD SETTING METHOD

CROSS-REFERENCE TO RELATED APPLICATION

This application is a 371 application of the International PCT application serial no. PCT/JP2021/004024, filed on Feb. 4, 2021, which claims the priority benefits of Japan Patent Application No. 2020-042577, filed on Mar. 12, 2020. The entirety of each of the above-mentioned patent applications is hereby incorporated by reference herein and made a part of this specification.

TECHNICAL FIELD

The present invention relates to a photoelectric sensor and a threshold setting method.

RELATED ART

Conventionally, in a known photoelectric sensor, with an ON or OFF state immediately after optical axis adjustment of a light projection part and a light reception part being taken as a reference state, a threshold correction means includes a means which calculates a ratio of a set threshold to a moving average of a light reception amount at the time of OFF and stores this ratio, where an average value of the light reception amount at the time of OFF is generated, and the threshold is corrected by multiplying the average value of the light reception amount at the time of OFF by the ratio above (see Patent Document 1). This photoelectric sensor makes it possible to maintain a stable detection state even if the light reception amount changes over time.

RELATED ART DOCUMENT

Patent Document

[Patent Document 1] Japanese Patent Application Laid-Open No. 2007-139494

SUMMARY OF INVENTION

Problem to be Solved by Invention

In the photoelectric sensor described in Cited Document 1, the threshold is set with respect to changes over time in the light reception amount by setting the average value of the light reception amount at the time of OFF as a reference, calculating the ratio of the threshold to the set reference, and multiplying the calculated ratio by the average value of the light reception amount at the time of OFF.

However, in the photoelectric sensor described in Cited Document 1, for example, in the case where the light reception amount of the background is small and fluctuates greatly at the time of OFF, the set threshold may become large, and the threshold may not be set appropriately.

Therefore, one of the objectives of the present invention is to provide a photoelectric sensor and a threshold setting method capable of setting a more appropriate threshold with respect to changes over time in a light reception amount.

Means for Solving Problem

A photoelectric sensor according to an embodiment of the present invention is a photoelectric sensor detecting an object, and includes a light reception part, an object determination part, and a setting part. The light reception part receives light to obtain a light reception amount. The object determination part determines presence/absence of the object based on the light reception amount and a threshold. The setting part sets the threshold based on the light reception amount during a period in which it has been determined that the object is present and the light reception amount during a period in which it has been determined that the object is absent.

According to this embodiment, the threshold is set based on the light reception amount during a period in which it has been determined that an object is present, and the light reception amount during a period in which it has been determined that the object is absent. Accordingly, it is possible to reflect, in the setting of the threshold, changes in the light reception amounts of both the time when the object is present and the time when the object is absent. Therefore, for example, compared with a conventional photoelectric sensor which is strongly affected by a change in the light reception amount of the time when the object is absent, it is possible to more appropriately set the threshold with respect to changes over time in the light reception amount.

In the above embodiment, the setting part may calculate a correction value based on one of a maximum and a minimum of the light reception amount during a period in which it has been determined that the object is present, and another of a maximum and a minimum of the light reception amount during a period in which it has been determined that the object is absent, and set the correction value as the threshold.

According to this embodiment, the correction value is calculated based on one of the maximum and the minimum of the light reception amount during the period in which it has been determined that the object is present, and another of the maximum and the minimum of the light reception amount during the period in which it has been determined that the object is absent. Accordingly, for example, it is possible to reflect, in the threshold, both the maximum of the light reception amount of the time when the object is present and the minimum of the light reception amount of the time when the object is absent. Therefore, it is possible to set a threshold in which the influence of a sudden change in the light reception amount is suppressed.

In the above embodiment, the setting part may calculate a correction value based on an average of the light reception amount during a period in which it has been determined that the object is present and an average of the light reception amount during a period in which it has been determined that the object is absent, and set the correction value as the threshold.

According to this embodiment, the correction value is calculated based on the average of the light reception amount during the period in which it has been determined that the object is present and the average of the light reception amount during the period in which it has been determined that the object is absent. Accordingly, it is possible to reflect, in the threshold, both the average of the light reception amount of the time when the object is present and the average of the light reception amount of the time when the object is absent. Therefore, it is possible to set a threshold in which the influence of a sudden change in the light reception amount is further suppressed.

In the above embodiment, the setting part may calculate a correction value according to a value based on an average and a variance in a distribution of the light reception amount during a period in which it has been determined that the object is present, and a value based on an average and a variance in a distribution of the light reception amount during a period in which it has been determined that the object is absent, and set the correction value as the threshold.

According to this embodiment, the correction value is calculated according to a value based on the average and the variance in the distribution of the light reception amount during the period in which it has been determined that the object is present, and a value based on the average and the variance in the distribution of the light reception amount during the period in which it has been determined that the object is absent. Accordingly, it is possible to reflect, in the threshold, both the value based on the average and the variance in the distribution of the light reception amount of the time when the object is present, and the value based on the average and the variance in the distribution of the light reception amount of the time when the object is absent. Therefore, it is possible to set a threshold in which the influence of a sudden change in the light reception amount is further suppressed.

In the above embodiment, the photoelectric sensor may further include a setting determination part which determines whether setting of the threshold is possible based on the light reception amount during a period in which it has been determined that the object is present and the light reception amount during a period in which it has been determined that the object is absent. When it is determined that setting of the threshold is possible, the setting part may set the threshold.

According to this embodiment, whether setting of the threshold is possible is determined based on the light reception amount during the period in which it has been determined that the object is present and the light reception amount during the period in which it has been determined that the object is absent. Accordingly, for example, it is possible to monitor a difference between the light reception amount of the time when the object is present and the light reception amount of the time when the object is absent, i.e., monitoring a margin in the setting of the threshold. Therefore, it is possible to appropriately determine whether setting of the threshold is possible.

In the above embodiment, the setting determination part may determine whether setting of the threshold is possible based on a difference between one of a maximum and a minimum of the light reception amount during a period in which it has been determined that the object is present, and another of a maximum and a minimum of the light reception amount during a period in which it has been determined that the object is absent.

According to this embodiment, whether setting of the threshold is possible is determined based on a difference between one of the maximum and the minimum of the light reception amount during the period in which it has been determined that the object is present, and another of the maximum and the minimum of the light reception amount during the period in which it has been determined that the object is absent. Accordingly, for example, it is possible to monitor a margin in the setting of the threshold according to the difference between the maximum of the light reception amount of the time when the object is present and the minimum of the light reception amount of the time when the object is absent. Therefore, it is possible to more appropriately determine whether setting of the threshold is possible.

In the above embodiment, the setting determination part may determine whether setting of the threshold is possible according to a difference between a value based on an average and a variance in a distribution of the light reception amount during a period in which it has been determined that the object is present, and a value based on an average and a variance in a distribution of the light reception amount during a period in which it has been determined that the object is absent.

According to this embodiment, whether correction of the threshold is possible is determined according to a difference between a value based on the average and the variance in the distribution of the light reception amount during the period in which it has been determined that the object is present, and a value based on the average and the variance in the distribution of the light reception amount during the period in which it has been determined that the object is absent. Accordingly, it is possible to monitor a margin in the setting of the threshold according to the difference between the value based on the average and the variance in the distribution of the light reception amount of the time when the object is present, and the value based on the average and the variance in the distribution of the light reception amount of the time when the object is absent. Therefore, it is possible to more appropriately determine whether setting of the threshold is possible.

In the above embodiment, the photoelectric sensor may further include an output part which outputs unsettability of the threshold when it is determined that setting of the threshold is not possible.

According to this embodiment, when it is determined that setting of the threshold is not possible, "threshold unsettable" is outputted. Accordingly, it is possible to notify that the change over time in the light reception amount has reached a level at which presence/absence of the object cannot be determined.

A threshold setting method according to another embodiment of the present invention is a threshold setting method of a photoelectric sensor detecting an object, and includes the following steps. In a light reception step, light is received to obtain a light reception amount. In an object determination step, presence/absence of the object is determined based on the light reception amount and a threshold. In a setting step, the threshold is set based on the light reception amount during a period in which it has been determined that the object is present and the light reception amount during a period in which it has been determined that the object is absent.

According to this embodiment, the threshold is set based on the light reception amount during a period in which it has been determined that an object is present, and the light reception amount during a period in which it has been determined that the object is absent. Accordingly, it is possible to reflect, in the setting of the threshold, changes in the light reception amounts of both the time when the object is present and the time when the object is absent. Therefore, for example, compared with a conventional threshold setting method which is strongly affected by a change in the light reception amount of the time when the object is absent, it is possible to more appropriately set the threshold with respect to changes over time in the light reception amount.

Effect of Invention

According to the present invention, it is possible to set a more appropriate threshold with respect to changes over time in a light reception amount.

DESCRIPTION OF EMBODIMENTS

An embodiment of the present invention will be described below. In the description of drawings below, the same or similar parts are represented by the same or similar reference signs. However, the drawings are schematic. Therefore, the specific dimensions and the like should be determined in light of the following description. In addition, obviously, parts having different dimensional relationships and ratios are included among the drawings. Furthermore, the technical scope of the present invention should not be construed as being limited to the embodiment.

Figure 1:
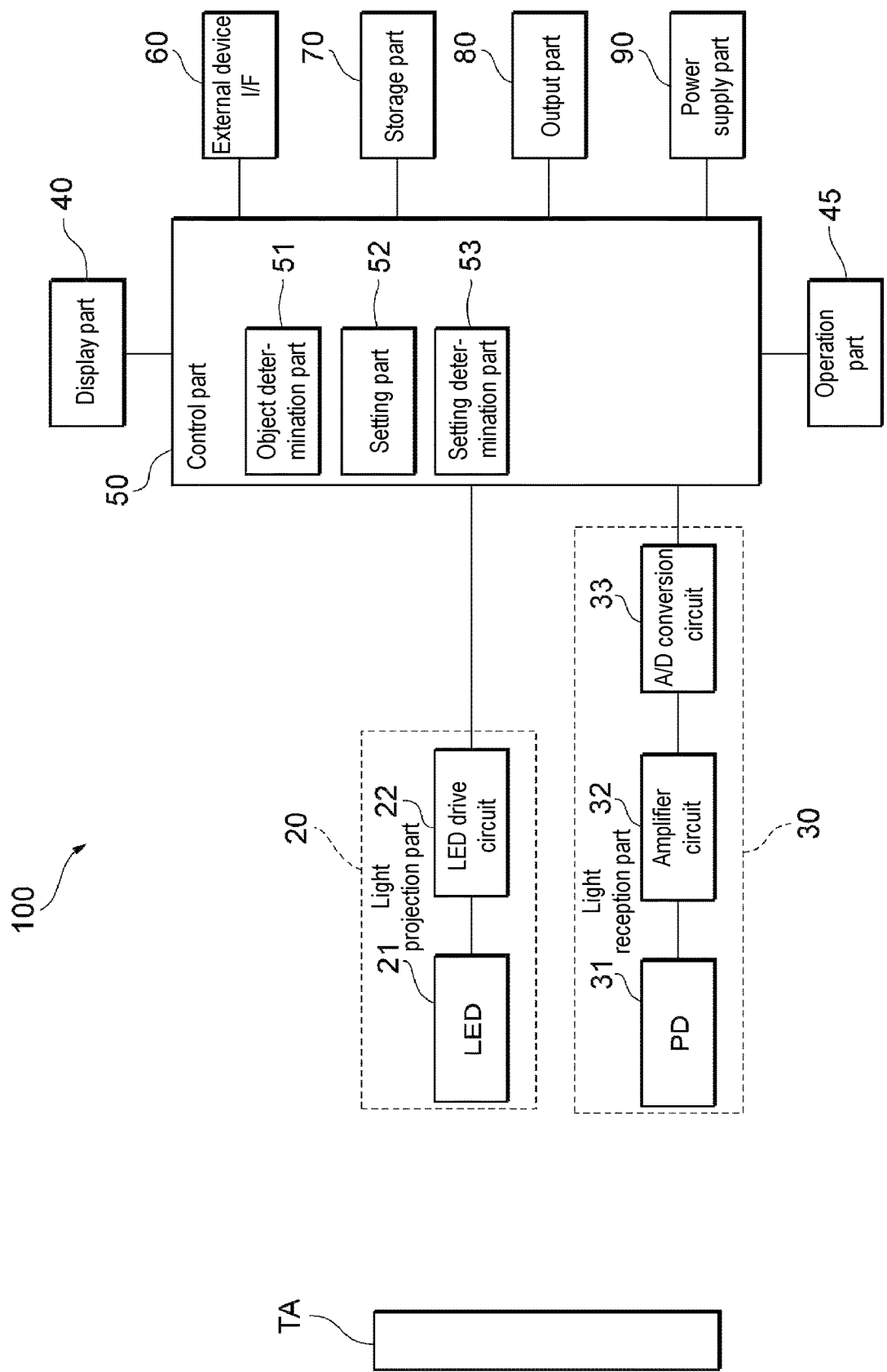
FIG. 1 is a block diagram illustrating a schematic configuration of a photoelectric sensor according to an embodiment.

First, a configuration of a photoelectric sensor according to an embodiment will be described with reference to FIG. 1. FIG. 1 is a block diagram illustrating a schematic configuration of a photoelectric sensor 100 according to an embodiment.

As shown in FIG. 1, the photoelectric sensor 100 includes a light projection part 20, a light reception part 30, a display part 40, an operation part 45, a control part 50, an external device I/F (interface) 60, a storage part 70, an output part 80, and a power supply part 90. The light projection part 20, the light reception part 30, the display part 40, the operation part 45, the control part 50, the external device I/F 60, the storage part 70, the output part 80, and the power supply part 90 are accommodated in a main body part 10 to be described later.

However, the parts of the photoelectric sensor 100 are not limited to being accommodated in one main body part 10. For example, the parts of the photoelectric sensor 100 may be accommodated in two or more spaces.

The photoelectric sensor 100 of the present embodiment is a photoelectric sensor (also referred to as a photoelectric switch) which detects presence/absence of an object TA by utilizing various properties of light. Photoelectric sensors are roughly classified into a reflective type which detects an object based on a light reception amount of light reflected by the object, and a transmissive type which detects an object based on blocking of light by the object. In the following description, unless otherwise specified, a reflective-type photoelectric sensor will be described.

The light projection part 20 serves to project light onto the object TA. The light projection part 20 includes, for example, an LED (light emitting diode) 21 and an LED drive circuit 22.

The light reception part 30 is configured to receive light to obtain a light reception amount. The light reception part 30 includes, for example, a PD (photodiode) 31, an amplifier circuit 32, and an A/D conversion circuit 33.

Figure 2:
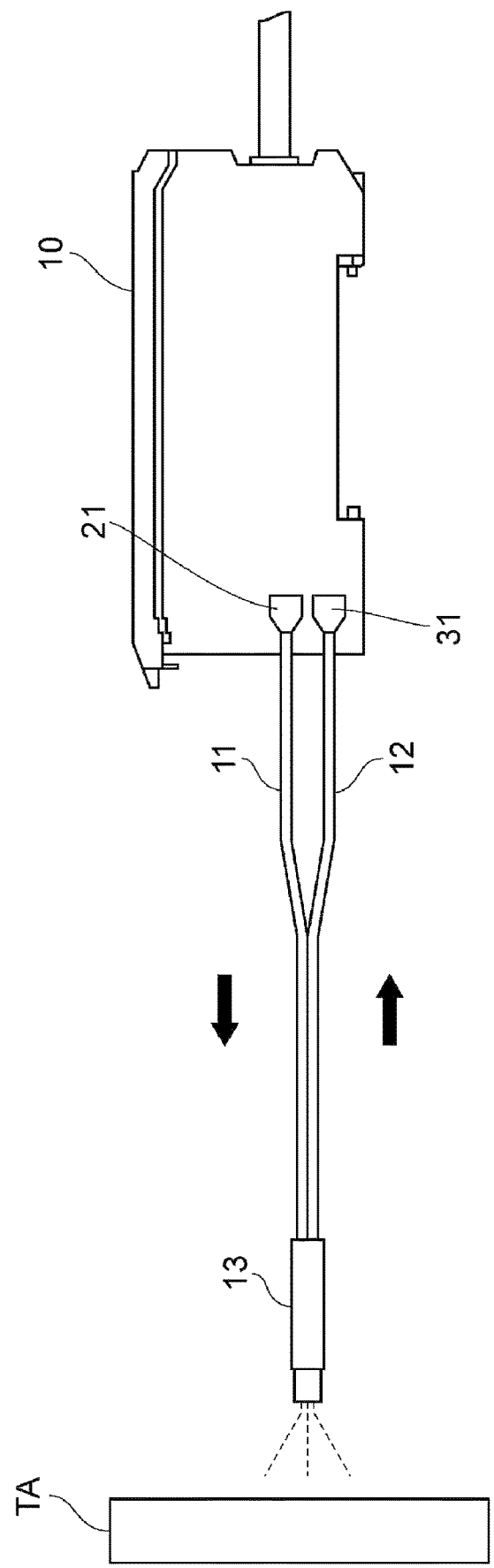
FIG. 2 is a schematic view illustrating a detection principle of the photoelectric sensor shown in FIG. 1.

Herein, with reference to FIG. 2, a principle for a photoelectric sensor according to an embodiment to detect an object will be described. FIG. 2 is a schematic view illustrating a detection principle of the photoelectric sensor 100 according to an embodiment.

As shown in FIG. 2, the photoelectric sensor 100 includes a main body part 10 and optical fibers 11 and 12 attached to a front surface of the main body part 10. The optical fiber 11 serves for light projection, and the other optical fiber 12 serves for light reception. A head part 13 including a lens or the like is attached to a tip part of each of the optical fibers 11 and 12.

The optical fibers 11 and 12 are respectively inserted into insertion ports (not shown) on the front surface of the main body part 10. The LED 21 of the light projection part 20 is arranged in the vicinity of the insertion port of the optical fiber 11 serving for light projection, and the PD 31 of the light reception part 30 is arranged in the vicinity of the insertion port of the optical fiber 12 serving for light reception.

When the photoelectric sensor 100 is used, the head part 13 is arranged at a predetermined distance from the object TA. The light from the LED 21 of the light projection part 20 is emitted from the head part 13 via the optical fiber 11. The light reflected by the object TA and entering the head part 13 reaches the PD 31 of the light reception part 30 via the optical fiber 12.

The light reception amount data generated by the light reception part 30 is inputted to the control part 50 and compared with a threshold registered in advance to determine whether light is reflected by the object TA and output the determination result.

In the example shown in FIG. 2, in the photoelectric sensor 100, the light projected from the light projection part and reflected by the object TA is received by the light reception part, and reception of the reflected light is determined as "there is an object".

Returning to the description of FIG. 1, the control part 50 is configured to control the operation of each part of the photoelectric sensor 100. The control part 50 includes, for example, a processor such as a CPU (central processing unit). According to a program stored in the storage part 70 configured to include a memory, while controlling the operations of the light projection part 20 and the light reception part 30, the control part 50 executes a detection process based on the light reception amount data inputted from the light reception part 30. The detection result is outputted via the output part 80 or the external device I/F 60. The details of the control part 50 will be described later.

The operation part 45 serves to input information to the photoelectric sensor 100. The operation part 45 includes, for example, a button, a switch, a touch panel, a keyboard, etc.

The display part 40 serves to display information. The display part 40 includes, for example, an indicator light and a display.

The control part 50 includes an object determination part 51, a setting part 52, and a setting determination part 53 as functional blocks.

The object determination part 51 is configured to determine presence/absence of the object TA based on a light reception amount obtained by the light reception part 30 and a threshold. The object determination part 51 outputs a detection signal as a determination result. For example, the detection signal has a high signal level (hereinafter also referred to as the detection signal being "ON") when the object TA is present, and has a low signal level (hereinafter also referred to as the detection signal being "OFF") when the object TA is absent.

Generally, the light reception amount obtained by the photoelectric sensor 100 tends to decrease as time passes due to state changes in the surrounding environment or the photoelectric sensor 100 itself. Factors that reduce the light reception amount include, for example, uncleanness due to adhesion of dust, oil, welding spatter, etc. to light projection/reception surfaces or a detection surface, changes in a mounting state due to vibration or contact, uncleanness of the object, variations depending on the lot of the object TA, deterioration of parts, movement of equipment, changes in ambient temperature, ambient light, magnetic field, etc. due to seasonal changes, etc. Therefore, the photoelectric sensor 100 sets the threshold described above according to such changes over time in the light reception amount.

The setting part 52 is configured to set the threshold based on a light reception amount during a period in which it has been determined that the object TA is present and a light reception amount during a period in which it has been determined that the object TA is absent. The period in which it has been determined that the object TA is present is a period (hereinafter also referred to as an "ON period") in which the object determination part 51 determines that the object TA is present and the detection signal is "ON". On the other hand, the period in which it has been determined that the object TA is absent is a period (hereinafter also referred to as an "OFF period") in which the object determination part 51 determines that the object TA is absent and the detection signal is "OFF".

More specifically, the setting part 52 is configured to calculate a correction value based on the light reception amount during the period in which it has been determined that the object TA is present and the light reception amount during the period in which it has been determined that the object TA is absent, and set the calculated correction value as the threshold. Various modes may be adopted as the method for calculating the correction value. A specific example of calculating the correction value will be described later.

The setting determination part 53 is configured to determine whether setting of the threshold is possible based on the light reception amount during the period in which it has been determined that the object TA is present and the light reception amount during the period in which it has been determined that the object TA is absent. The setting part 52 sets the threshold when it is determined that setting of the threshold is possible.

In this manner, by determining whether setting of the threshold is possible based on the light reception amount during the period in which it has been determined that the object TA is present and the light reception amount during the period in which it has been determined that the object TA is absent, for example, it is possible to monitor a difference between the light reception amount of the time when the object TA is present and the light reception amount of the time when the object TA is absent, i.e., monitoring a margin in the setting of the threshold. Therefore, it is possible to appropriately determine whether setting of the threshold is possible.

On the other hand, when it is determined that setting of the threshold is not possible, the output part 80 is configured to output "threshold unsettable" based on the control signal from the control part 50.

In this manner, when it is determined that setting of the threshold is not possible, by outputting "threshold unsettable", it is possible to notify that the change over time in the light reception amount has reached a level at which presence/absence of the object TA cannot be determined.

Figure 3:
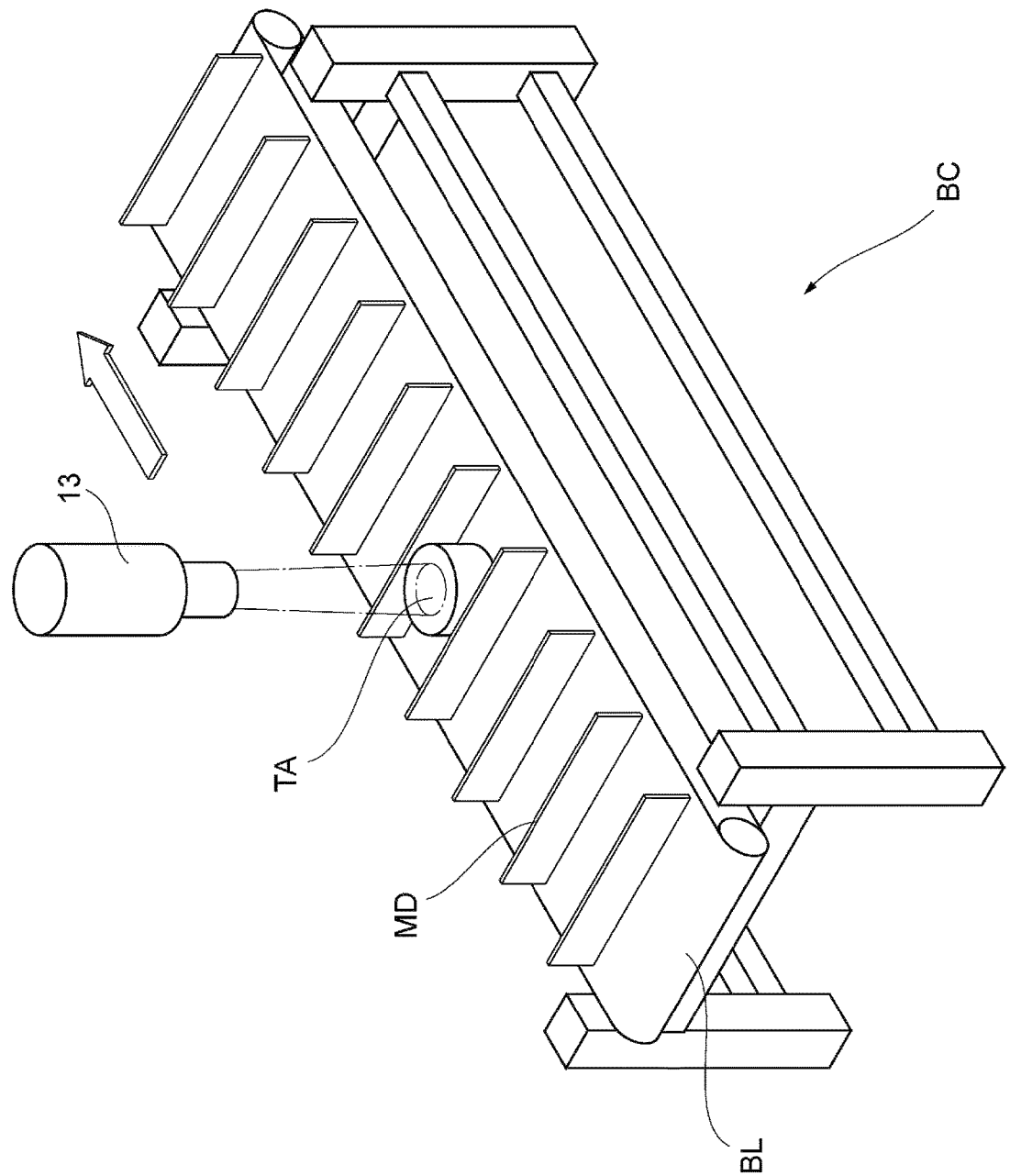
FIG. 3 is a configuration view illustrating a schematic configuration of a belt conveyor on which a photoelectric sensor according to an embodiment is installed.

Next, an application example of the photoelectric sensor according to an embodiment will be described with reference to FIG. 3. FIG. 3 is a configuration view illustrating a schematic configuration of a belt conveyor BC on which the photoelectric sensor 100 according to an embodiment is installed.

As shown in FIG. 3, the belt conveyor BC is configured to transport an object TA placed on a belt BL in a direction of an arrow shown in FIG. 3 by circulating the annular belt BL.

The head part 13 of the photoelectric sensor 100 is arranged above the belt conveyor BC, and is installed to irradiate light to the moving object TA and receive the reflected light.

A plurality of metal partitions MD are provided on the belt BL. The object TA is placed between two metal partitions MD and is transported. The belt BL is generally made of a material containing black rubber as a main component and has a relatively low reflectance. On the other hand, the metal partition MD is made of metal which has a relatively high reflectance. The belt BL and the metal partition MD of the belt conveyor BC correspond to an example of a background in the example shown in FIG. 2.

Figure 4:
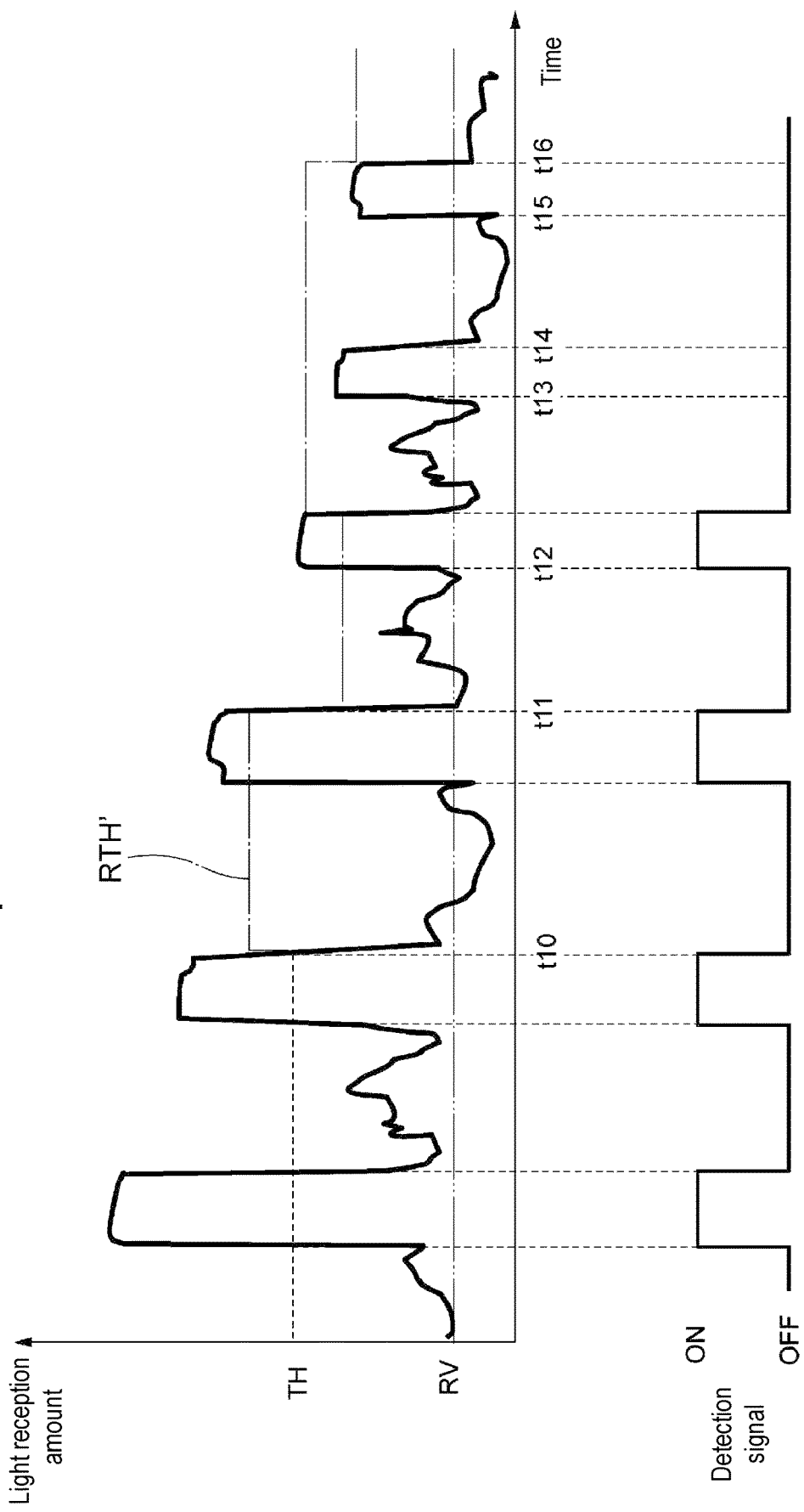
FIG. 4 is a graph illustrating an over-time change in a light reception amount of a photoelectric sensor according to a conventional example.

Herein, the setting of the threshold in a photoelectric sensor of a conventional example will be described with reference to FIG. 4. FIG. 4 is a graph illustrating an over-time change in a light reception amount of a photoelectric sensor according to a conventional example. In FIG. 4, the horizontal axis is time and the vertical axis is the light reception amount. Further, "ON" or "OFF" of the detection signal corresponding to the over-time change in the light reception amount is shown at the bottom of the graph. Since the configuration of the photoelectric sensor of the conventional example is similar to the configuration of the photoelectric sensor 100 shown in FIG. 1, the illustration and description thereof will be omitted.

As shown in FIG. 4, until a time t10, the photoelectric sensor of the conventional example determines presence/absence of an object based on a light reception amount and an initial threshold TH, and outputs "ON" or "OFF" of the detection signal.

In the photoelectric sensor of the conventional example, for example, at the time t10, the initial threshold TH is corrected and a new threshold RTH' is set.

When setting the new threshold RTH', in the photoelectric sensor of the conventional example, first, an average value of the light reception amount during the OFF period of the initial phase is set as a reference value RV, and a ratio of the threshold to the reference value RV is calculated. In the photoelectric sensor of the conventional example, next, this ratio is multiplied by the average value of the light reception amount during the OFF period to calculate the new threshold RTH'.

However, in the photoelectric sensor of the conventional example, if a light reception amount of the background is small and fluctuates greatly during the OFF period, the threshold may not be set appropriately.

Specifically, for example, during the OFF period in which the object is absent, in a state where the light reception amount is small due to the low reflectance of the belt BL shown in FIG. 3, the light reception amount suddenly increases due to the presence of the metal partition MD having a high reflectance on the belt BL, and as a result, the light reception amount fluctuates greatly. In such a case, since the photoelectric sensor of the conventional example calculates the set threshold RTH' by using the light reception amount during the OFF period, it is greatly affected by the fluctuation in the light reception amount during the OFF period. Therefore, for example, with the light reception amount greatly fluctuating during a period between a time t11 and a time t12, the new threshold RTH' becomes a large value. As a result, during a period between a time t13 and a time t14 and a period between a time t15 and a time t16, even though the light reception amount changes due to the presence of the object, the photoelectric sensor of the conventional example cannot detect the object and cannot output the detection signal "ON". Therefore, in the photoelectric sensor of the conventional example, the value of the new threshold RTH' may not be appropriate.

Figure 5:
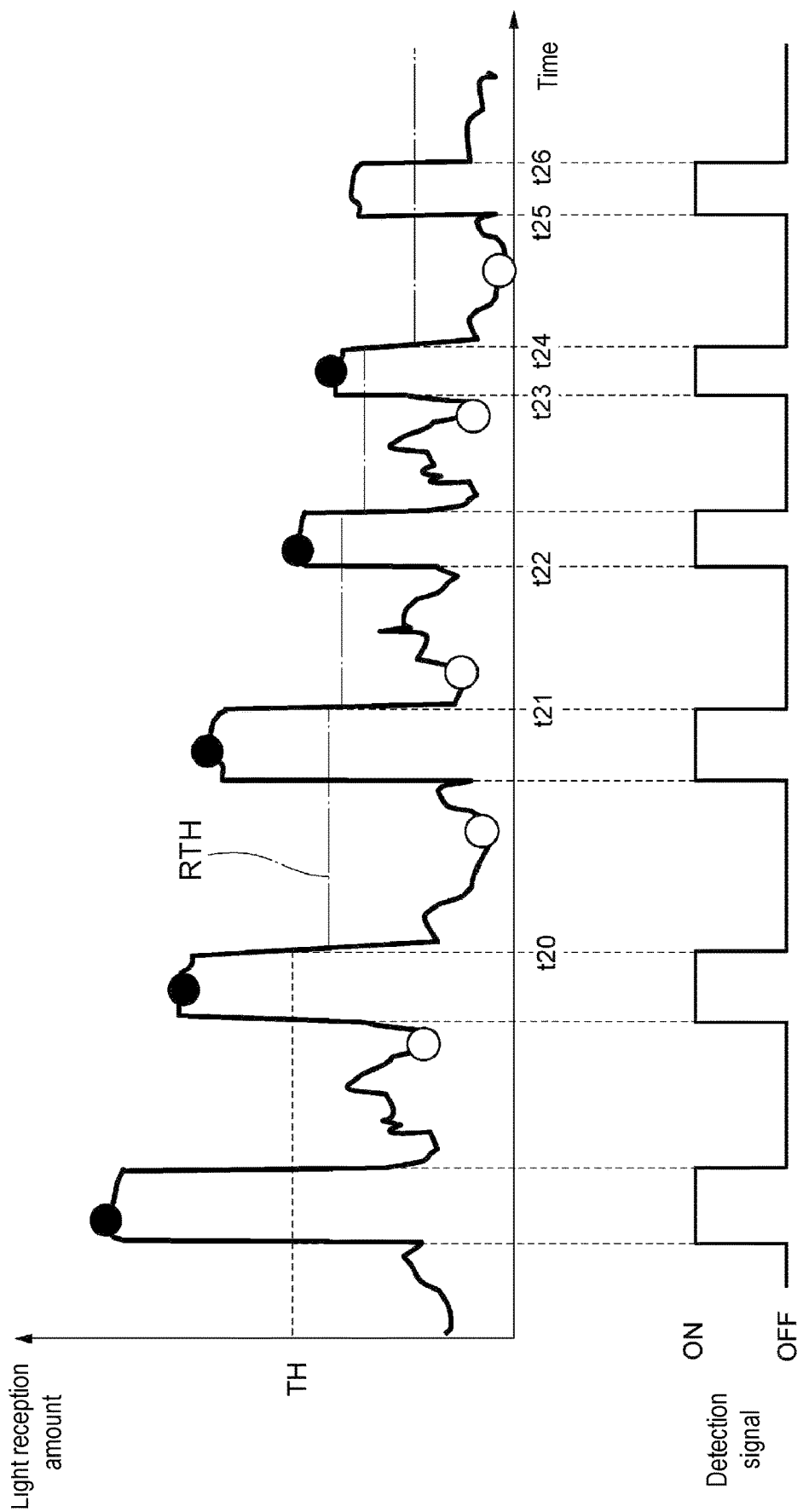
FIG. 5 is a graph illustrating an over-time change in the light reception amount of the photoelectric sensor according to an embodiment.

Next, the setting of the threshold in the photoelectric sensor according to an embodiment will be described with reference to FIG. 5. FIG. 5 is a graph illustrating an over-time change in the light reception amount of the photoelectric sensor according to an embodiment. In FIG. 5, the horizontal axis is time and the vertical axis is the light reception amount. Further, "ON" or "OFF" of the detection signal corresponding to the over-time change in the light reception amount is shown at the bottom of the graph.

As shown in FIG. 5, similar to the photoelectric sensor of the conventional example, until a time t20, the photoelectric sensor 100 determines presence/absence of an object based on a light reception amount and an initial threshold TH, and outputs a detection signal "ON" or "OFF".

The photoelectric sensor 100 corrects the initial threshold TH and sets a new threshold RTH, for example, at the time t20.

As described above, based on the light reception amount during a period in which it has been determined that the object TA is present and a light reception amount during a period in which it has been determined that the object TA is absent, a correction value is calculated, and the correction value is set as the new threshold RTH. Specifically, the setting part 52 calculates the correction value based on the light reception amount (white circle shown in FIG. 5) during the OFF period immediately before the time t20 and the light reception amount (black circle shown in FIG. 5) during the ON period immediately before the time t20, and the setting part 52 sets the correction value as the new threshold RTH.

Therefore, for example, if the light reception amount fluctuates greatly during a period between a time t21 and a time t22, since the setting part 52 further corrects the corrected threshold RTH based on not only the light reception amount during the OFF period but also the light reception amount during the ON period, the corrected threshold RTH can be set to an appropriate value. As a result, even during a period between a time t23 and a time t24 and a period between a time t25 and a time t26, the photoelectric sensor 100 can detect the object TA and can output a detection signal of "ON".

In this manner, by setting the threshold based on the light reception amount during the period in which it has been determined that the object TA is present and the light reception amount during the period in which it has been determined the object TA is absent, it is possible to reflect, in the setting of the threshold, the changes in the light reception amounts of both the time when the object TA is present and the time when the object TA is absent. Therefore, for example, compared with the photoelectric sensor of the conventional example which is strongly affected by the change in the light reception amount of the time when the object is absent, the threshold can be set more appropriately with respect to the change over time in the light reception amount.

Figure 6:
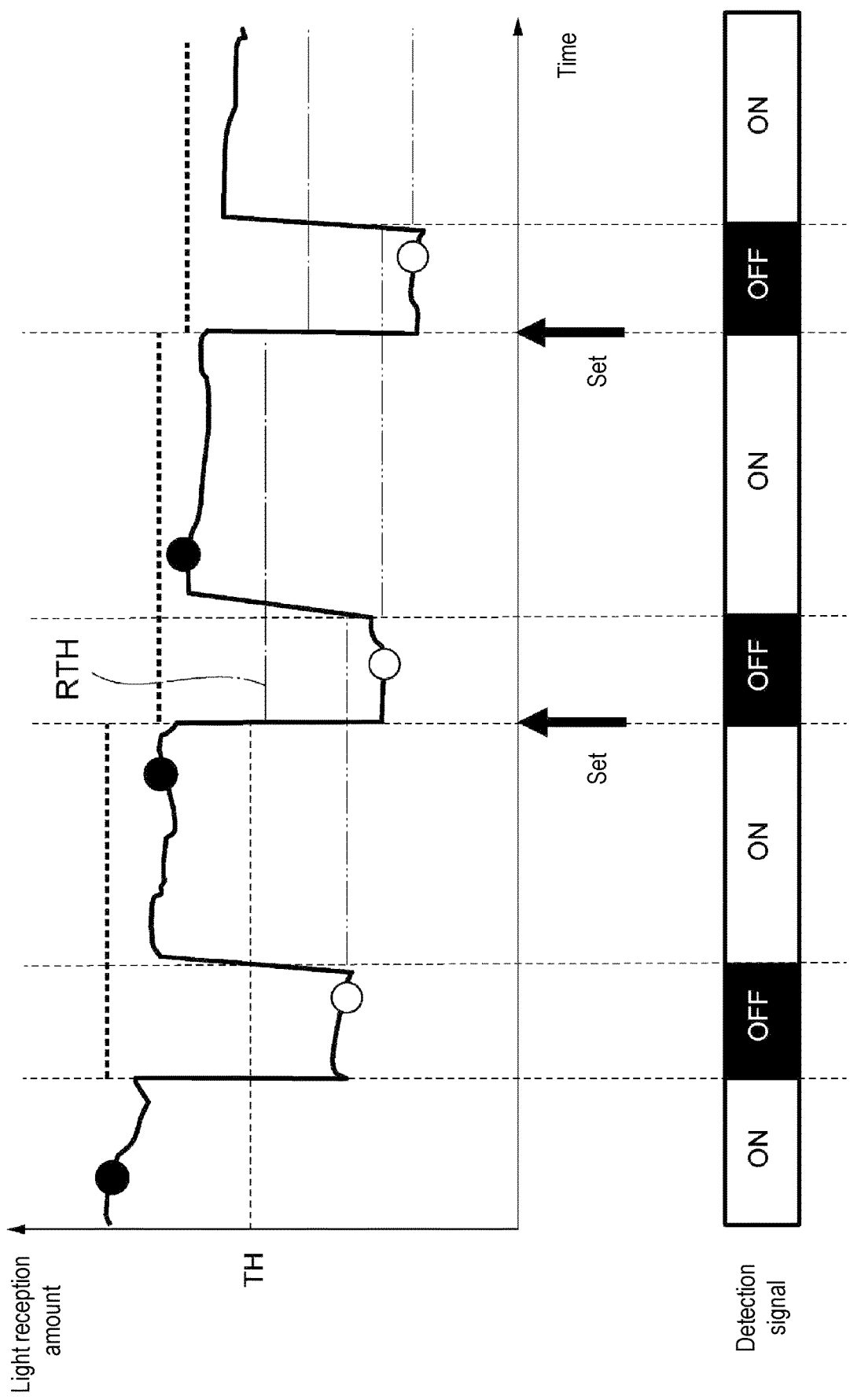
FIG. 6 is a graph illustrating an over-time change in the light reception amount of the photoelectric sensor according to an embodiment.
Figure 7:
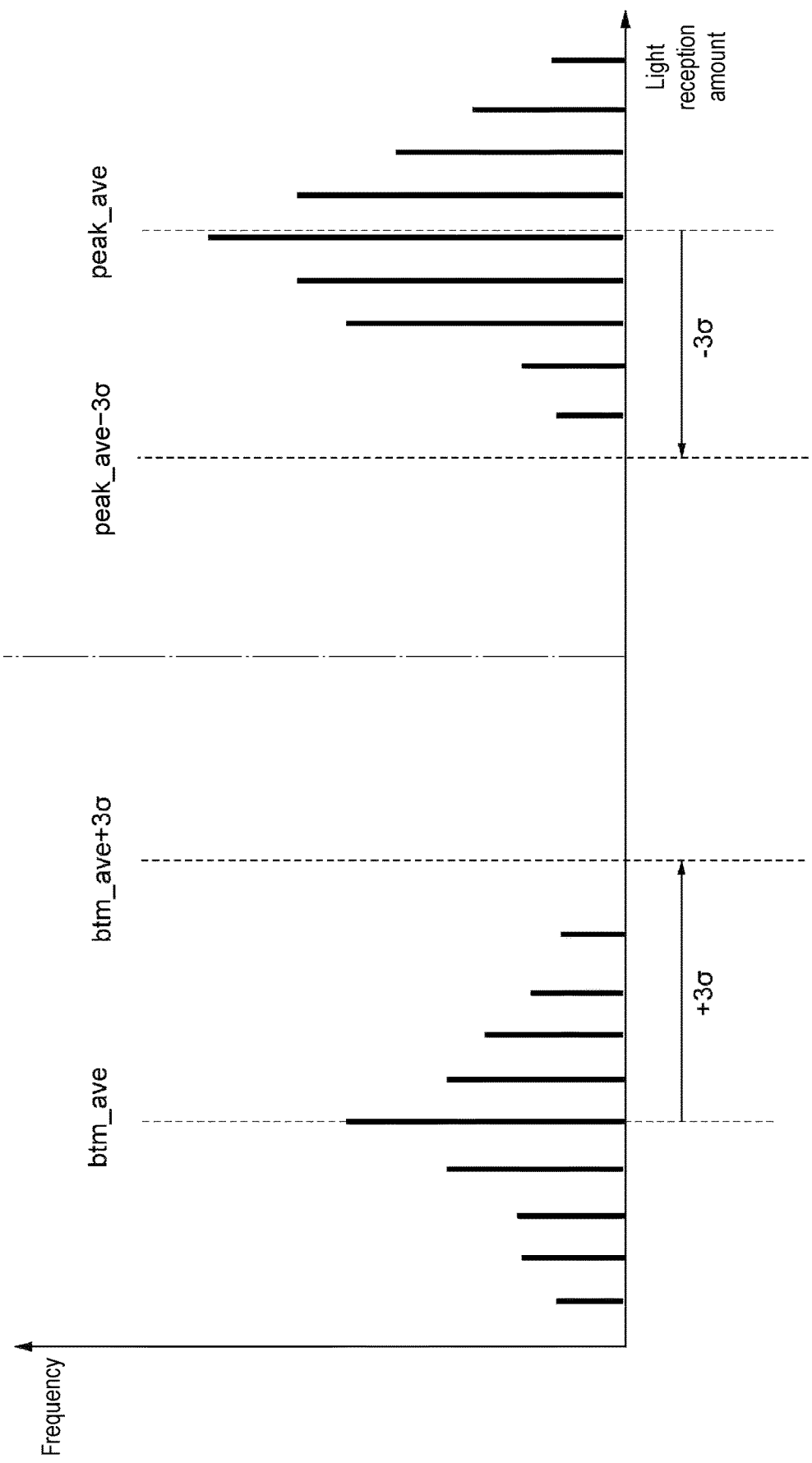
FIG. 7 is a graph illustrating a frequency distribution of the light reception amount of the photoelectric sensor according to an embodiment.

Next, a method of calculating a correction value in the photoelectric sensor according to an embodiment will be described with reference to FIG. 6 and FIG. 7. FIG. 6 is a graph illustrating an over-time change in the light reception amount of the photoelectric sensor 100 according to an embodiment. FIG. 7 is a graph illustrating a frequency distribution of the light reception amount of the photoelectric sensor 100 according to an embodiment. In FIG. 6, the horizontal axis is time and the vertical axis is the light reception amount. In FIG. 7, the horizontal axis is the light reception amount and the vertical axis is the frequency (number of times).

For example, as shown in FIG. 6, the setting part 52 is configured to calculate a correction value based on a minimum (white circle shown in FIG. 6) of the light reception amount during the OFF period and a maximum (black circle shown in FIG. 6) of the light reception amount during the ON period. Specifically, the setting part 52 calculates, as the correction value, an average ((btm+peak)/2) of the minimum (btm) of the light reception amount during the OFF period and the maximum (peak) of the light reception amount during the ON period. In the example shown in FIG. 6, the OFF period and the ON period combined are taken as one cycle, and the setting part 52 sets a calculated correction value as a new threshold for each cycle.

In the case where the photoelectric sensor 100 is a transmissive-type photoelectric sensor, contrary to the reflective-type photoelectric sensor, the light reception amount during the OFF period is relatively large, and the light reception amount during the ON period is relatively small. In this case, the setting part 52 is configured to calculate the correction value based on the maximum of the light reception amount during the OFF period and the minimum of the light reception amount during the ON period.

In this manner, by calculating the correction value based on one of the maximum and the minimum of the light reception amount during the period in which it has been determined that the object TA is present, and another of the maximum and the minimum of the light reception amount during the period in which it has been determined that the object TA is absent, for example, it is possible to reflect, in the threshold, both the maximum of the light reception amount of the time when the object TA is present and the minimum of the light reception amount of the time when the object TA is absent. Therefore, it is possible to set a threshold in which the influence of a sudden change in the light reception amount is suppressed.

Further, the setting part 52 may use an average of the light reception amount instead of the maximum and the minimum of the light reception amount. For example, the setting part 52 may be configured to calculate a correction value based on an average of the light reception amount during the OFF period and an average of the light reception amount during the ON period. In this case, the setting part 52 obtains the average (off_ave) of the light reception amount during the OFF period and the average (on_ave) of the light reception amount during the ON period, and then calculates an average ((off_ave+on_ave)/2) thereof as the correction value. Then, the setting part 52 sets the calculated correction value as the threshold for each cycle.

In this manner, by calculating the correction value based on the average of the light reception amount during the period in which it has been determined that the object TA is present and the average of the light reception amount during the period in which it has been determined that the object TA is absent, it is possible to reflect, in the threshold, both the average of the light reception amount of the time when the object TA is present and the average of the light reception amount of the time when the object TA is absent. Therefore, it is possible to set a threshold in which the influence of a sudden change in the light reception amount is further suppressed.

Alternatively, the setting part 52 may calculate the correction value by using a distribution of the light reception amount over a plurality of cycles. For example, in the case where the frequency distribution of the light reception amount during the OFF period and the ON period in the past plurality of cycles is the example shown in FIG. 7, first, the setting part 52 obtains a value based on an average (btm_ave) and a variance ($\sigma^{1/2}$) for the distribution of the relatively small light reception amount corresponding to the OFF period. As an example, the setting part 52 calculates a value (btm_ave+3$\sigma$) obtained by adding three times the standard deviation ($\sigma$) to the average. Similarly, the setting part 52 obtains a value based on an average (peak_ave) and a variance ($\sigma^{1/2}$) for the distribution of the relatively large light reception amount corresponding to the ON period. As an example, the setting part 52 calculates a value (peak_ave−3$\sigma$) obtained by subtracting three times the standard deviation ($\sigma$) from the average. Next, the setting part 52 calculates an average ({(btm_ave+3$\sigma$)+ (peak_ave−3$\sigma$)}/2) of these values as the correction value. Then, the setting part 52 sets the calculated correction value as the threshold for each plurality of cycles.

In the case where the photoelectric sensor 100 is a transmissive-type photoelectric sensor, first, the setting part 52 calculates a value based on an average (peak_ave) and a variance ($\sigma^{1/2}$) for the distribution of the relatively large light reception amount corresponding to the OFF period, for example, calculating a value (peak_ave−3$\sigma$) obtained by subtracting three times the standard deviation ($\sigma$) from the average. Similarly, the setting part 52 calculates a value based on an average (btm_ave) and a variance ($\sigma^{1/2}$) for the distribution of the relatively small light reception amount corresponding to the ON period, for example, calculating a value (btm_ave+3$\sigma$) obtained by adding three times the standard deviation ($\sigma$) to the average. Next, the setting part 52 calculates an average ({(btm_ave+3$\sigma$)+(peak_ave-3$\sigma$)}/2) of these values as the correction value.

In this manner, by calculating the correction value according to a value based on the average and the variance in the distribution of the light reception amount during the period in which it has been determined that the object TA is present, and a value based on the average and the variance in the distribution of the light reception amount during the period in which it has been determined that the object TA is absent, for example, it is possible to reflect, in the threshold, both the value based on the average and the variance in the distribution of the light reception amount of the time when the object TA is present, and the value based on the average and the variance in the distribution of the light reception amount of the time when the object TA is absent. Therefore, it is possible to set a new threshold in which the influence of a sudden change in the light reception amount is further suppressed.

Figure 8:
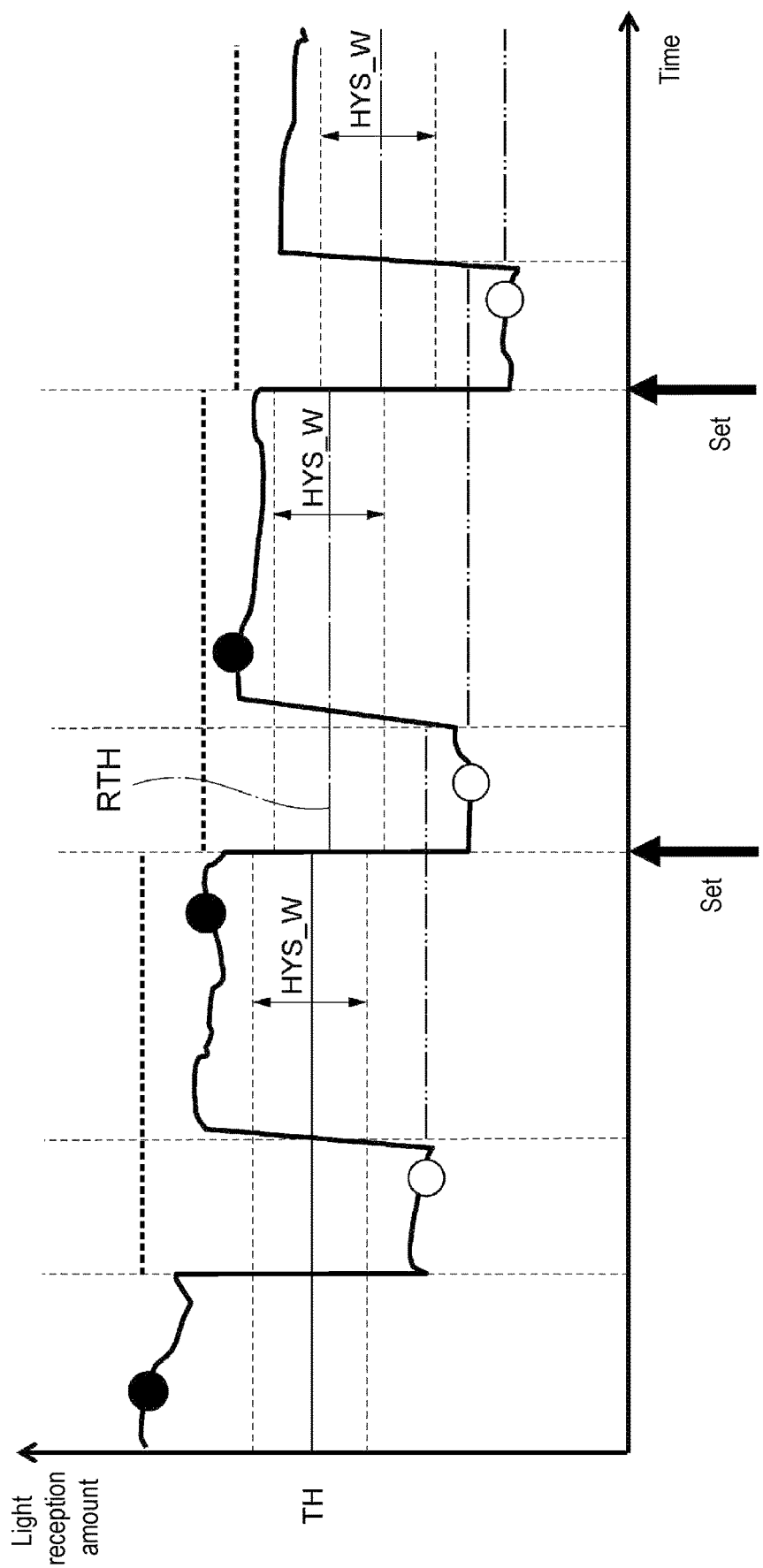
FIG. 8 is a graph illustrating an over-time change in the light reception amount of the photoelectric sensor according to an embodiment.
Figure 9:
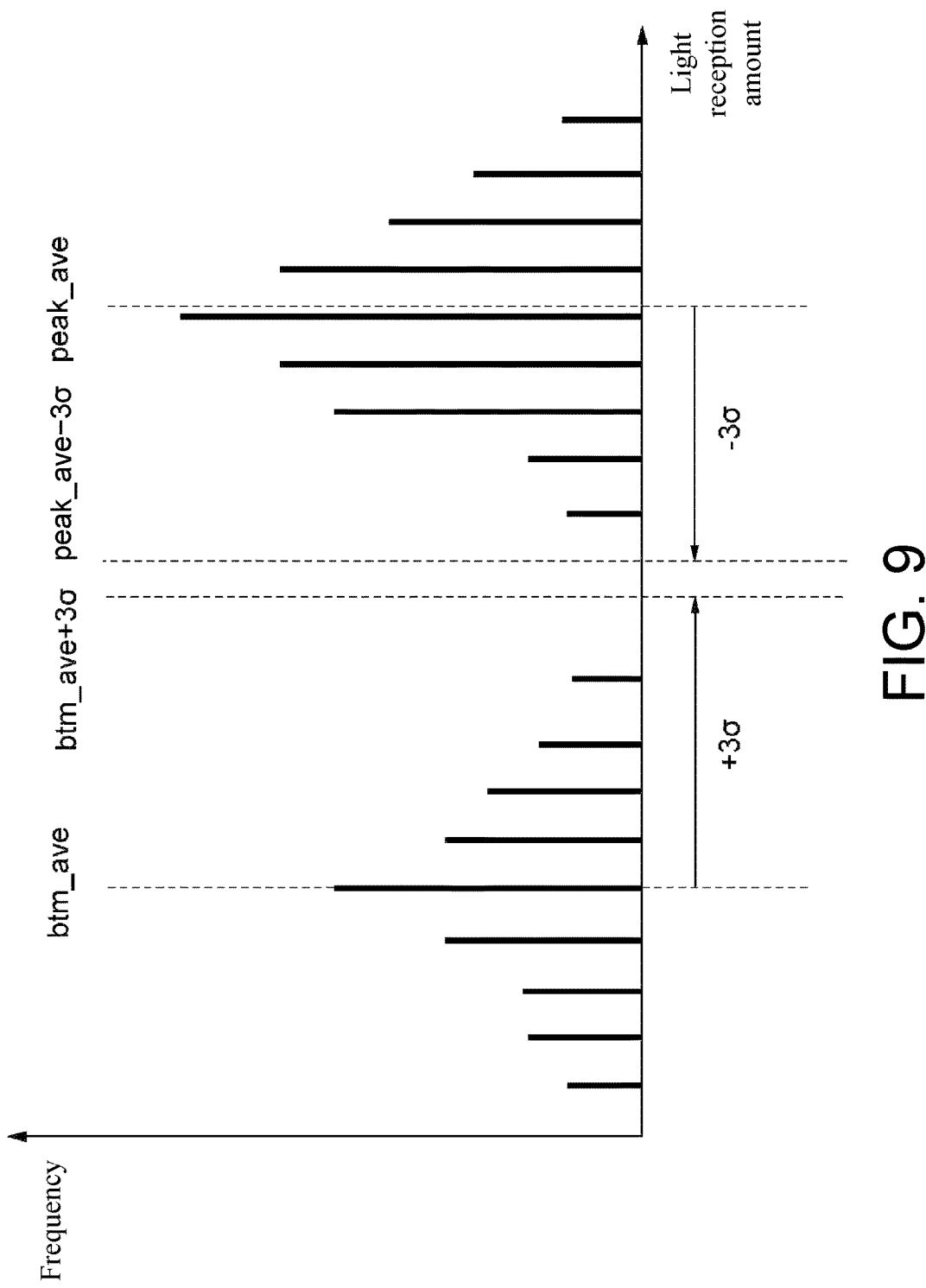
FIG. 9 is a graph illustrating a frequency distribution of the light reception amount of the photoelectric sensor according to an embodiment.

Next, with reference to FIG. 8 and FIG. 9, a method of determining whether a threshold can be set in the photoelectric sensor according to an embodiment will be described. FIG. 8 is a graph illustrating an over-time change in the light reception amount of the photoelectric sensor 100 according to an embodiment. FIG. 9 is a graph illustrating a frequency distribution of the light reception amount of the photoelectric sensor 100 according to an embodiment. In FIG. 8, the horizontal axis is time and the vertical axis is the light reception amount. In FIG. 9, the horizontal axis is the light reception amount and the vertical axis is the frequency (number of times).

For example, as shown in FIG. 8, the setting determination part 53 is configured to determine whether setting of the threshold is possible based on a difference between a minimum (white circle shown in FIG. 8) of the light reception amount during the OFF period and a maximum (black circle shown in FIG. 8) of the light reception amount during the ON period. Specifically, the setting determination part 53 calculates a difference (peak-btm) between the maximum (peak) of the light reception amount during the ON period and the minimum (btm) of the light reception amount during the OFF period, and compares the difference with a predetermined value, e.g., a hysteresis width HYS_W set for the threshold. As a result of the comparison, if the calculated difference is equal to or greater than the hysteresis width HYS_W (peak−btm≥HYS_W), the setting determination part 53 determines that setting of the threshold is possible. On the other hand, as a result of the comparison, if the calculated difference is less than the hysteresis width HYS_W (peak−btm<HYS_W), the setting determination part 53 determines that setting of the threshold is not possible.

In the case where the photoelectric sensor 100 is a transmissive-type photoelectric sensor, the setting determination part 53 is configured to determine whether setting of the threshold is possible based on a difference between the maximum of the light reception amount during the OFF period and the minimum of the light reception amount during the ON period.

In this manner, by determining whether setting of the threshold is possible based on a difference between one of the maximum and the minimum of the light reception amount during the period in which it has been determined that the object TA is present, and another of the maximum and the minimum of the light reception amount during the period in which it has been determined that the object TA is absent, for example, it is possible to monitor a margin in the setting of the threshold according to the difference between the maximum of the light reception amount of the time when the object TA is present and the minimum of the light reception amount of the time when the object TA is absent. Therefore, it is possible to more appropriately determine whether setting of the threshold is possible.

Further, the setting determination part 53 may determine whether setting of the threshold is possible by using a distribution of the light reception amount over a plurality of cycles. For example, in the case where the frequency distribution of the light reception amount during the OFF period and the ON period in the past plurality of cycles is the example shown in FIG. 9, first, the setting determination part 53 calculates a value based on an average (btm_ave) and a variance ($\sigma^{1/2}$) for the distribution of the relatively small light reception amount corresponding to the OFF period, for example, calculating a value (btm_ave+3σ) obtained by adding three times the standard deviation (σ) to the average. Similarly, the setting determination part 53 calculates a value based on an average (peak_ave) and a variance ($\sigma^{1/2}$) for the distribution of the relatively large light reception amount corresponding to the ON period, for example, calculating a value (peak_ave−3σ) obtained by subtracting three times the standard deviation (σ) from the average. Next, the setting determination part 53 calculates a difference ((peak_ave−3σ)−(btm_ave+3σ)) between these values and compares the difference with a predetermined value, e.g., zero. As a result of the comparison, if the calculated difference is equal to or greater than zero ((peak_ave−3σ)−(btm_ave+3σ)≥0), the setting determination part 53 determines that setting of the threshold is possible. On the other hand, as a result of the comparison, if the calculated difference is less than zero ((peak_ave−3σ)−(btm_ave+3σ)<0), the setting determination part 53 determines that setting of the threshold is not possible.

In the case where the photoelectric sensor 100 is a transmissive-type photoelectric sensor, first, the setting determination part 53 calculates a value based on an average (peak_ave) and a variance ($\sigma^{1/2}$) for the distribution of the relatively large light reception amount corresponding to the OFF period, for example, calculating a value (peak_ave−3σ) obtained by subtracting three times the standard deviation (σ) from the average. Similarly, the setting determination part 53 calculates a value based on an average (btm_ave) and a variance ($\sigma^{1/2}$) for the distribution of the relatively small light reception amount corresponding to the ON period, for example, calculating a value (btm_ave+3σ) obtained by adding three times the standard deviation (o) to the average. Next, the setting determination part 53 calculates a difference ((peak_ave−3σ)−(btm_ave+3σ)) between these values and compares the difference with a predetermined value, e.g., zero.

In this manner, by determining whether setting of the threshold is possible according to a difference between a value based on the average and the variance in the distribution of the light reception amount during the period in which it has been determined that the object TA is present, and a value based on the average and the variance in the distribution of the light reception amount during the period in which it has been determined that the object TA is absent, it is possible to monitor a margin in the setting of the threshold according to the difference between the value based on the average and the variance in the distribution of the light reception amount of the time when the object TA is present, and the value based on the average and the variance in the distribution of the light reception amount of the time when the object TA is absent. Therefore, it is possible to more appropriately determine whether setting of the threshold is possible.

Figure 10:
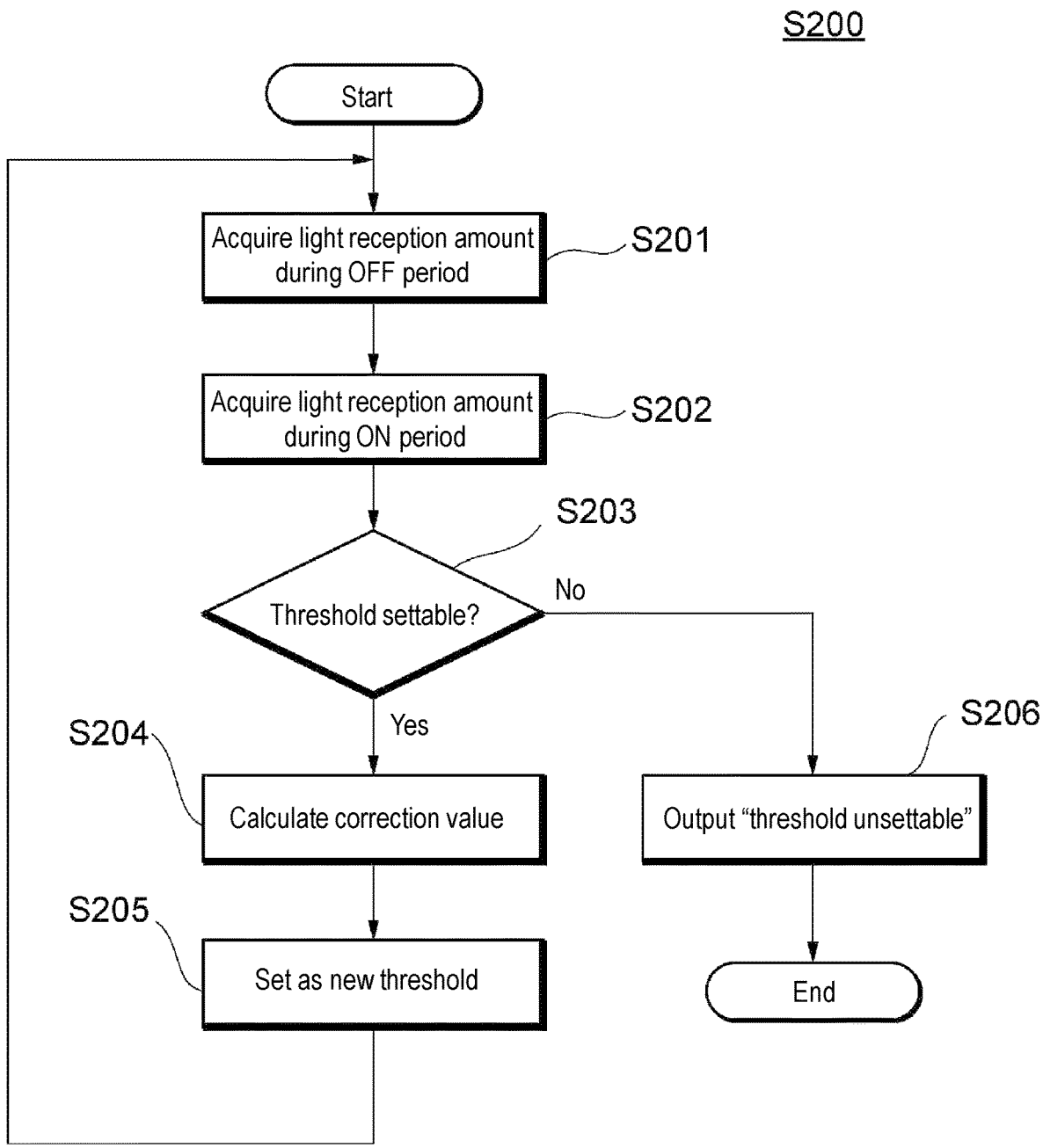
FIG. 10 is a flowchart illustrating a schematic operation of a threshold correction setting process S200 of the photoelectric sensor according to an embodiment.

Next, an example of a threshold setting method of the photoelectric sensor 100 according to an embodiment will be described with reference to FIG. FIG. 10 is a flowchart illustrating a schematic operation of a threshold setting process S200 of the photoelectric sensor 100 according to an embodiment.

In the following description, for the sake of brevity, unless otherwise specified, it is assumed that the correction value is calculated based on one of a maximum and a minimum of a light reception amount during a period in which it has been determined that the object TA is present, and another of a maximum and a minimum of a light reception amount during a period in which it has been determined that the object TA is absent. Further, it is assumed that whether the threshold can be set is determined based on a difference between one of a maximum and a minimum of a light reception amount during a period in which it has been determined that the object TA is present, and another of a maximum and a minimum of a light reception amount during a period in which it has been determined that the object TA is absent. Further, it is assumed that an initial value has been set for the threshold.

As shown in FIG. 10, first, the control part 50 acquires a light reception amount during a period in which it has been determined that an object TA is absent, i.e., during an OFF period (S201).

Next, the control part 50 acquires a light reception amount during a period in which it has been determined that the object TA is present, i.e., during an ON period (S202).

Next, the setting determination part 53 determines whether setting of a threshold is possible based on the light reception amount during the OFF period and the light reception amount during the ON period (S203). Specifically, the setting determination part 53 performs the determination on the basis of a difference between a minimum of the light reception amount during the OFF period and a maximum of the light reception amount during the ON period.

In step S203, the setting determination part 53 may also perform the determination on the basis of a difference between a value based on an average and a variance in a distribution of the light reception amount during the period in which it has been determined that the object TA is present, and a value based on an average and a variance in a distribution of the light reception amount during a period in which it has been determined that the object TA is absent.

As a result of the determination in step S203, if setting of the threshold is possible, the setting part 52 calculates a correction value based on the minimum of the light reception amount during the OFF period and the maximum of the light reception amount during the ON period (S204).

In step S204, the setting part 52 may also calculate the correction value based on an average of the light reception amount during the period in which it has been determined that the object TA is present, and an average of the light reception amount during the period in which it has been determined that the object TA is absent. Also, the setting part 52 may also calculate the correction value according to a value based on an average and a variance in a distribution of the light reception amount during the period in which it has been determined that the object TA is present, and a value based on an average and a variance in a distribution of the light reception amount during the period in which it has been determined that the object TA is absent.

Next, the setting part 52 sets the correction value calculated in step S204 as a new threshold (S205). In the case where an initial value has not been set as the threshold, the setting part 52 sets the correction value calculated in step S204 as the initial value of the threshold. After step S205, the control part 50 again performs steps S201 to S205.

On the other hand, as a result of the determination in step S203, if setting of the threshold is not possible, the output part 80 outputs "threshold unsettable" (S206). Then, after step S206, the control part 50 ends the threshold setting process S200.

The order in the sequence and flowchart described in the present embodiment may be changed as long as there is no contradiction in the process.

The exemplary embodiments of the present invention have been described above. According to the photoelectric sensor 100 and the threshold setting method according to an embodiment of the present invention, a threshold is set based on a light reception amount during a period in which it has been determined that an object TA is present, and a light reception amount during a period in which it has been determined that the object TA is absent. Accordingly, it is possible to reflect, in the setting of the threshold, changes in the light reception amounts of both the time when the object TA is present and the time when the object TA is absent. Therefore, for example, compared with a photoelectric sensor of a conventional example which is strongly affected by a change in the light reception amount of the time when the object is absent, it is possible to more appropriately set the threshold with respect to changes over time in the light reception amount.

The embodiments described above serve to facilitate understanding of the present invention and are not intended to limit the interpretation of the present invention. The present invention may be modified/improved without departing from the spirit thereof, and equivalents thereof are also included in the present invention. That is, appropriate design changes made by those skilled in the art to the embodiments are also included in the scope of the present invention as long as they have the features of the present invention. For example, elements included in the embodiments and their arrangements, materials, conditions, shapes, sizes, etc. are not limited to those exemplified and may be appropriately changed. Moreover, as the embodiments are exemplary, obviously it is possible to partially replace or combine the configurations shown in different embodiments, and these are also included in the scope of the present invention as long as they include the features of the present invention.

(Appendix 1)

A photoelectric sensor (100), which is a photoelectric sensor (100) detecting an object (TA), the photoelectric sensor (100) including:
- a light reception part (30) which receives light to obtain a light reception amount;
- an object determination part (51) which determines presence/absence of the object (TA) based on the light reception amount and a threshold; and
- a setting part (52) which sets the threshold based on the light reception amount during a period in which it has been determined that the object (TA) is present and the light reception amount during a period in which it has been determined that the object (TA) is absent.

(Appendix 9)

A threshold setting method, which is a threshold setting method of a photoelectric sensor detecting an object (TA), the threshold setting method including:
- a light reception step of receiving light to obtain a light reception amount;
- an object determination step of determining presence/absence of the object (TA) based on the light reception amount and a threshold; and
- a setting step of setting the threshold based on the light reception amount during a period in which it has been determined that the object (TA) is present and the light reception amount during a period in which it has been determined that the object (TA) is absent.

What is claimed is:

1. A photoelectric sensor, which is a photoelectric sensor detecting an object, the photoelectric sensor comprising:
   a light reception part which receives light to obtain a light reception amount;
   an object determination part which determines presence/absence of the object based on the light reception amount and a threshold; and
   a setting part which sets the threshold based on the light reception amount during a period in which it has been determined that the object is present and the light reception amount during a period in which it has been determined that the object is absent,
   wherein the setting part calculates a correction value based on one of a maximum and a minimum of the light reception amount during a period in which it has been determined that the object is present, and another of a maximum and a minimum of the light reception amount during a period in which it has been determined that the object is absent, and sets the correction value as the threshold.

2. The photoelectric sensor according to claim 1, further comprising a setting determination part which determines whether setting of the threshold is possible based on the light reception amount during a period in which it has been determined that the object is present and the light reception amount during a period in which it has been determined that the object is absent,
   wherein when it is determined that setting of the threshold is possible, the setting part sets the threshold.

3. The photoelectric sensor according to claim 2, wherein the setting determination part determines whether setting of the threshold is possible based on a difference between one of a maximum and a minimum of the light reception amount during a period in which it has been determined that the object is present, and another of a maximum and a minimum of the light reception amount during a period in which it has been determined that the object is absent.

4. The photoelectric sensor according to claim 2, wherein the setting determination part determines whether setting of the threshold is possible according to a difference between a value based on an average and a variance in a distribution of the light reception amount during a period in which it has been determined that the object is present, and a value based on an average and a variance in a distribution of the light reception amount during a period in which it has been determined that the object is absent.

5. The photoelectric sensor according to claim 2, further comprising an output part which outputs unsettability of the threshold when it is determined that setting of the threshold is not possible.

6. A threshold setting method, which is a threshold setting method of a photoelectric sensor detecting an object, the threshold setting method comprising:
   a light reception step of receiving light to obtain a light reception amount;
   an object determination step of determining presence/absence of the object based on the light reception amount and a threshold; and
   a setting step of setting the threshold based on the light reception amount during a period in which it has been determined that the object is present and the light reception amount during a period in which it has been determined that the object is absent,
   wherein the setting step comprises calculating a correction value based on one of a maximum and a minimum of the light reception amount during a period in which it has been determined that the object is present, and another of a maximum and a minimum of the light reception amount during a period in which it has been determined that the object is absent, and setting the correction value as the threshold.

* * * * *